Oct. 10, 1944.  N. E. TILLOTSON  2,359,948
METHOD OF MAKING DIPPED RUBBER ARTICLES
Filed Feb. 14, 1941
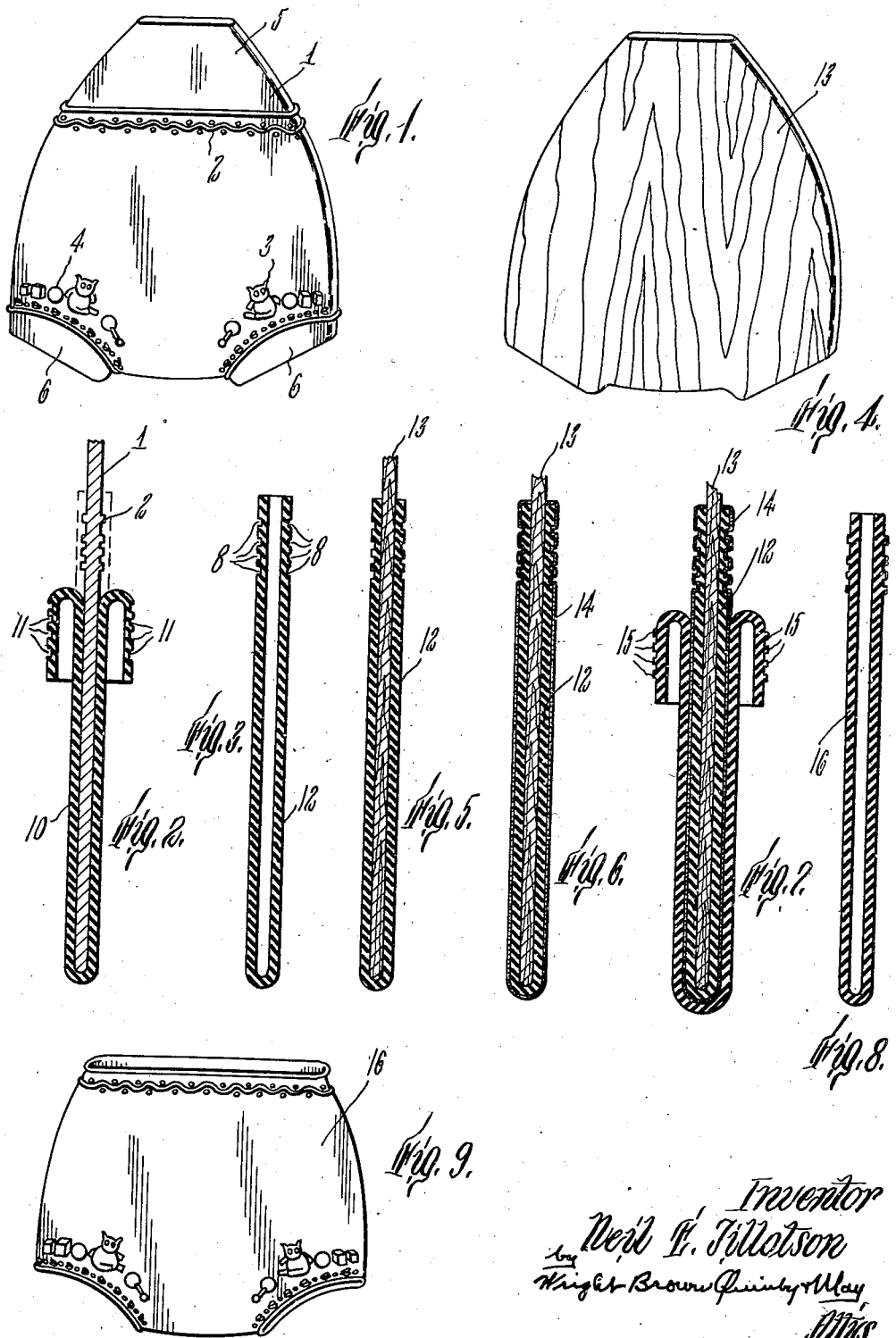

Patented Oct. 10, 1944

2,359,948

UNITED STATES PATENT OFFICE 2,359,948

METHOD OF MAKING DIPPED RUBBER ARTICLES

Neil E. Tillotson, Watertown, Mass.

Application February 14, 1941, Serial No. 378,840

3 Claims. (Cl. 18—41)

This invention relates to the manufacture of rubber articles more particularly by the process of dipping forms in latex, and after coagulation, stripping the rubber from the forms.

One object is to provide improved forms for the dipping operation by the use of which surface ornamentation in relief is produced in the completed articles.

Another object of the present invention is to provide a new and improved method of preparing the forms.

In accordance with this invention there is provided a master form on which the ornamentation is first formed as by engraving as it is desired to appear in the finished rubber articles. From this master form are made negatives which are stripped from the master form inside out and are then mounted on plane surfaced supporting elements to constitute therewith negative working forms which are dipped in latex to form the completed rubber articles. After dipping, the resultant articles are stripped from the working forms inside out, whereupon the desired ornamentation appears in relief on the outside of the articles.

For a more complete understanding of this invention, reference may be had to the accompanying drawing in which Figure 1 is a perspective view of a master form suitable for the production of baby pants provided with surface ornamentation.

Figure 2 is a similar view of one of the foundation elements forming a part of a working negative form.

Figures 3 to 8, inclusive, are sectional views illustrating successive steps in the manufacture of the working forms and the completed articles.

Figure 9 is a perspective view of the finished article.

Referring to the drawing, in Figure 1 is illustrated a master form 1 which may be made of metal or other durable material, and with the desired ornamentation as at 2, 3 and 4 formed in positive thereon as by engraving or the like. The master form shown is for the manufacture of baby pants and is provided with an outward projection 5 to which may be attached suitable clamps (not shown) by which it may be handled in the dipping operation. This portion 5 as shown projects from the waist simulating portion of the dipping area of the form. There are also provided two extensions 6 from the lower portion of the form intended to define the leg openings of the article. As shown the ornamentation is arranged adjacent to the waist and leg openings, but it might be otherwise arranged if desired.

This master form is employed to produce one or more rubber articles each of which is employed as a surfacing for a foundation form member and which surfacing contains the ornamentation as at 8 in negative. For this purpose the master form may be dipped in latex in accordance with the well known method and for the desired number of times to produce a rubber coating 10 (see Figure 2) on the form of the desired thickness, the positive ornamentation such as 2 forming negative impressions in the inner face of the rubber coating as shown at 11. This coating, after coagulation, is peeled off from the master form in the manner shown in Figure 2, being turned inside out, thus producing a hollow rubber article 12 such as shown in Figure 3 having the ornamentation in negative thereon on its outer face as at 8. Next this article in cured form is drawn over a plane faced foundation form 13 such as is shown in Figure 4. This may be made, for example, of plywood or any other material having the desired characteristics of cheapness, ready workability into the desired shape, lightness, or other desirable quality. The foundation form with the rubber facing constitutes a working dipping form. In order to prevent the latex into which this working form is dipped from bonding too firmly thereto, the working form may be surfaced with a suitable protecting non-sticky parting medium such as talc, wax, or the like, as shown at 14. This working dipping form is thus provided with the ornamentation in negative so that when it is dipped in the latex and accumulated thereon to the desired thickness, it forms positive ornamentation on the inner face of the rubber article shown at 15 in Figure 7, partly removed. This coating may be peeled off when it reaches the desired thickness and may be suitably trimmed and treated as in the ordinary method of making dipped articles to form the completed rubber article 16 shown in Figures 8 and 9 with the desired ornamentation in positive on its outer face. It should be understood, of course, that the rubber coatings may be cured by any of the usual processes either before or after removal from their respective forms in accordance with usual or preferred practice.

It will be noted that by the method of this invention many working forms may be produced expeditiously and cheaply from a single master form so that the process of producing the desired articles in quantity is rendered easy and cheap.

From the foregoing description of the method, the working forms and an article which may be made in accordance with the method and by the use of such forms, it should be evident to those skilled in the art that any desired article capable of being made by a dipping or coating operation can be produced in the same manner and that various changes and modifications might be made without departing from the spirit or scope of this invention.

I claim:

1. The method of making a sheet rubber article having integral surface ornamentation thereon, which comprises making a master form for said article having said surface ornamentation in positive thereon, applying a rubber coating to said form in the shape and size of the article and allowing said coating to set to a cohesive layer having on the face next to said form a negative of such ornamentation, peeling off said layer from said form, applying said layer so peeled off and with said negative face out to a plane surfaced form of the required shape, whereby the negative of said ornamentation of said layer is outwardly faced, and thereafter employing the resultant article as a form in the manufacture of the desired articles.

2. The method of making a working form for the manufacture of an article having surface ornamentation thereon by applying rubber to said form and peeling the rubber from said form, which comprises making a master form with the desired ornamentation formed in positive thereon, coating the surface of said master form including the ornamentation thereon with rubber, to form a cohesive hollow rubber layer having the ornamentation in negative on its inner face, stripping said layer from said master form, and applying said layer inside out to the outer face of a plane surfaced working form foundation thereby producing on said working form foundation a coating embodying said design in negative.

3. The method of making a hollow sheet rubber article having surface ornamentation thereon, which comprises making a master form for said article having said surface ornamentation in positive thereon, applying a rubber coating to said form in the size and shape of the article and allowing said coating to set to a cohesive layer having on its inner face a negative of such ornamentation, peeling off said layer from said form, applying said layer so peeled off and inside out to a plane surfaced form of the required shape, whereby the negative of said ornamentation is outwardly faced, and thereafter employing the resultant article as a form in the manufacture of the desired hollow sheet rubber article.

NEIL E. TILLOTSON.